(12) United States Patent
Ishiyama

(10) Patent No.: US 7,617,855 B2
(45) Date of Patent: Nov. 17, 2009

(54) PNEUMATIC TIRE

(75) Inventor: Makoto Ishiyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 58 days.

(21) Appl. No.: 10/592,509

(22) PCT Filed: Feb. 17, 2005

(86) PCT No.: PCT/JP2005/002446

§ 371 (c)(1),
(2), (4) Date: Sep. 12, 2006

(87) PCT Pub. No.: WO2005/087516

PCT Pub. Date: Sep. 22, 2005

(65) Prior Publication Data

US 2007/0204947 A1    Sep. 6, 2007

(30) Foreign Application Priority Data

Mar. 12, 2004    (JP) .............................. 2004-071655

(51) Int. Cl.
*B60C 9/00*    (2006.01)
*B60C 9/18*    (2006.01)
*B60C 9/20*    (2006.01)

(52) U.S. Cl. ...................... 152/526; 152/534; 152/535; 152/538

(58) Field of Classification Search ................. 152/526, 152/532, 534, 535, 536, 537, 538, 539, 548, 152/555, 558, 559, 560, 561
See application file for complete search history.

(56) References Cited

U.S. PATENT DOCUMENTS

| | | | | |
|---|---|---|---|---|
| 3,735,791 A | * | 5/1973 | McKissick et al. | 152/454 |
| 5,355,926 A | * | 10/1994 | Takase | 152/527 |
| 5,547,005 A | * | 8/1996 | Ueyoko et al. | 152/209.25 |
| 6,478,064 B1 | * | 11/2002 | Ueyoko | 152/543 |
| 6,561,245 B1 | | 5/2003 | Close et al. | |

FOREIGN PATENT DOCUMENTS

| | | | |
|---|---|---|---|
| JP | 47-20806 A | | 10/1972 |
| JP | 51-37402 A | | 3/1976 |
| JP | 53-102503 A | | 9/1978 |
| JP | 03135802 | * | 6/1991 |
| JP | 4-66304 | * | 3/1992 |
| JP | 08216619 | * | 8/1996 |
| JP | 2002-205509 A | | 7/2002 |
| JP | 2004-268820 A | | 9/2004 |

* cited by examiner

*Primary Examiner*—Justin Fischer
(74) *Attorney, Agent, or Firm*—Sughrue Mion, PLLC

(57) ABSTRACT

The ground contact pressure on land portions 44 is uniformed so that drivability is improved and uneven wear is suppressed to improve wear resistance. The parts of the carcass layer 28 and belt layer 33 overlapping with the main grooves 42 are convexly curved toward the outside in the radial direction due to the internal pressure. The reinforcing layer 49 is arranged at the position spaced from the neutral axis of deformation in the compressed side in a certain distance, i.e. radially inside of the radially outermost carcass ply 30, and the steel cords 47 which extend in the direction including the tire width direction and its approximate direction and which act as supports for resisting against the compression force are embedded in the reinforcing layer. As a result, the above-mentioned curved deformation can be effectively suppressed.

5 Claims, 9 Drawing Sheets

PNEUMATIC TIRE

TECHNICAL FIELD

The present invention relates to a pneumatic tire having a reinforcing layer arranged in a tread portion to overlap with a carcass layer.

RELATED ART

A pneumatic tire such as described in Japanese Patent Application Laid-open No. 205,509/2002 is known as a prior art tire.

Such a tire has a carcass layer which toroidally extends between beads and which is composed of two carcass plies, a belt layer which is disposed radially outside of the carcass layer and which is composed of plural belt plies, and a tread which is disposed radially outside of the belt layer and which is provided with plural main grooves on the outer circumference. Embedded in the two carcass plies are reinforcing cords of organic fiber inclining in opposite directions with respect to the tire equator, while embedded in the belt plies are non-stretchable reinforcing cords such as a steel cord or reinforcing cord of organic fiber inclining in opposed directions at 10 to 40 degrees with respect to the tire equator.

Pneumatic tires in which the carcass layer consists of one carcass ply, and in which the reinforcing cords embedded in the carcass plies consists of non-stretchable steel cord or inclined at 90 degrees with respect to the tire equator, i.e. extends in the radial direction are also known.

DISCLOSURE OF THE INVENTION

Recently, a pneumatic tire has been demanded for a further drivability and a further wear resistance due to need for improving riding comfort of a vehicle and cost efficiency. The above-mentioned types of conventional tires, however, cannot sufficiently fulfill the requirement.

Thus, the present inventor has repeatedly studied and found that a ground-contact pressure of the land portions located between the tread end and the main groove and between the adjacent main grooves in the ground contact area is high at both transversely end parts near the main groove while it is low at the transversely center part, which means uneven pressure distribution, so that the drivability is lowered and uneven wear may caused to decrease the wear resistance since the both transversely end parts of the land portion wear in an earlier stage with respect to the center part.

Then, the present inventor further studied what mechanism causes the above-mentioned uneven ground contact pressure distribution, and reached the following findings. That is, as shown in FIG. 9, when a pneumatic tire 11 is rotating under a load, a part of a carcass layer 12 and a belt layer 13 located in the ground contact area and overlapping with land portions 14 (ribs and blocks) are allowed to deform in the radial direction, since there is no land portion 14 which acts as a support.

In the pneumatic tire 11, a give internal pressure is applied and it affects the carcass layer 12 and belt layer 13 to radially outwardly inflate them. In addition, the belt layer 13 has the embedded reinforcing cords which incline at 10 to 40 degrees with the tire equator, as mentioned above, so that its transversal bending rigidity is low. As a result, the parts of the carcass layer 12 and belt layer 13 located in the ground contact area near the locations overlapping with the main grooves 15 are convexly curved toward the outside in the radial direction.

In this way, when the parts of the carcass layer 12 and belt layer 13 near the locations overlapping with the main grooves 15 are convexly curved, this deformation is transferred to the land part 14 and thus the amount of compression at the land portion 14 near the main groove 15 is made larger than that at the center part of the land portion 14. As a result, as mentioned in the above, the ground contact pressure of the land portion 14 has an uneven distribution.

The present invention has been completed based on the above-mentioned findings and relates to a pneumatic tire having a carcass layer which toroidally extends between beads and which is composed of at least one carcass ply, a belt layer which is disposed radially outside of the carcass layer, and a tread which is disposed radially outside of the belt layer and which is provided with plural main grooves on the outer circumference, wherein a reinforcing layer is arranged in radially inward of the radially outermost carcass ply disposed in the tread to overlap with said main grooves and steel cord extending in a direction including the tire width direction and its approximate direction are embedded in the reinforcing layer. The direction including the tire width direction and its approximate direction, which is the extending direction of the steel cord, refers to the direction which is not approximate the tire circumferential direction, and specifically inclining at 45 to 90 degrees with respect to the tire equator.

As mentioned in the above, the parts of carcass layer and belt layer overlapping with the main grooves are convexly curved toward the outside in the radial direction when they are in the ground contact area. Such a deformation generates a tensile force in the radially outside from the neutral axis of deformation which usually locates near the radially innermost belt ply, and a compression force in the radially inside from the neutral axis.

In the present invention, the reinforcing layer is arranged at the position spaced from the neutral axis of deformation in the compressed side in a certain distance, i.e. radially inside of the radially outermost carcass ply, and the carcass cords which extend in the direction including the tire width direction and its approximate direction and which act as supports for resisting against the compression force are embedded in the reinforcing layer. As a result, the above-mentioned curved deformation can be effectively suppressed, thereby obtaining a uniform distribution of the ground contact pressure in the land part to improve the drivability as well as suppressing the uneven wear to improve the wear resistance.

With the tire configured according to claim 2, the above-mentioned curved deformation is strongly suppressed, thereby remarkably improving the drivability and wear resistance. Moreover, with the tire configured according to claim 3, the radial distance from the neutral axis of deformation to the reinforcing layer becomes longer to be able to further enhance the supporting function of the reinforcing layer.

With the tire configured according to claim 4, the cut edge of the steel cord in the reinforcing layer is surrounded by the carcass plies, so that it can effectively prevent cracks from occurring at the outer edge of the reinforcing layer in the width direction. Furthermore, with the tire configured according to claim 5, an operation of building the tire, i.e. an operation of attaching the reinforcing layer can be simplified and the curved deformations at all main grooves can be effectively suppressed.

When the extending direction of the steel cords in the reinforcing layer is made parallel with the extending direction of the reinforcing cord in the carcass ply adjacent to the reinforcing layer, the occurrence of the cracks at the outer edge in the width direction of the reinforcing layer, i.e. the cut edge of the steel cord can be more effectively prevented as compared with the case where these extending directions intersect with each other.

BEST MODE FOR CARRYING OUT THE INVENTION

Figure 1:
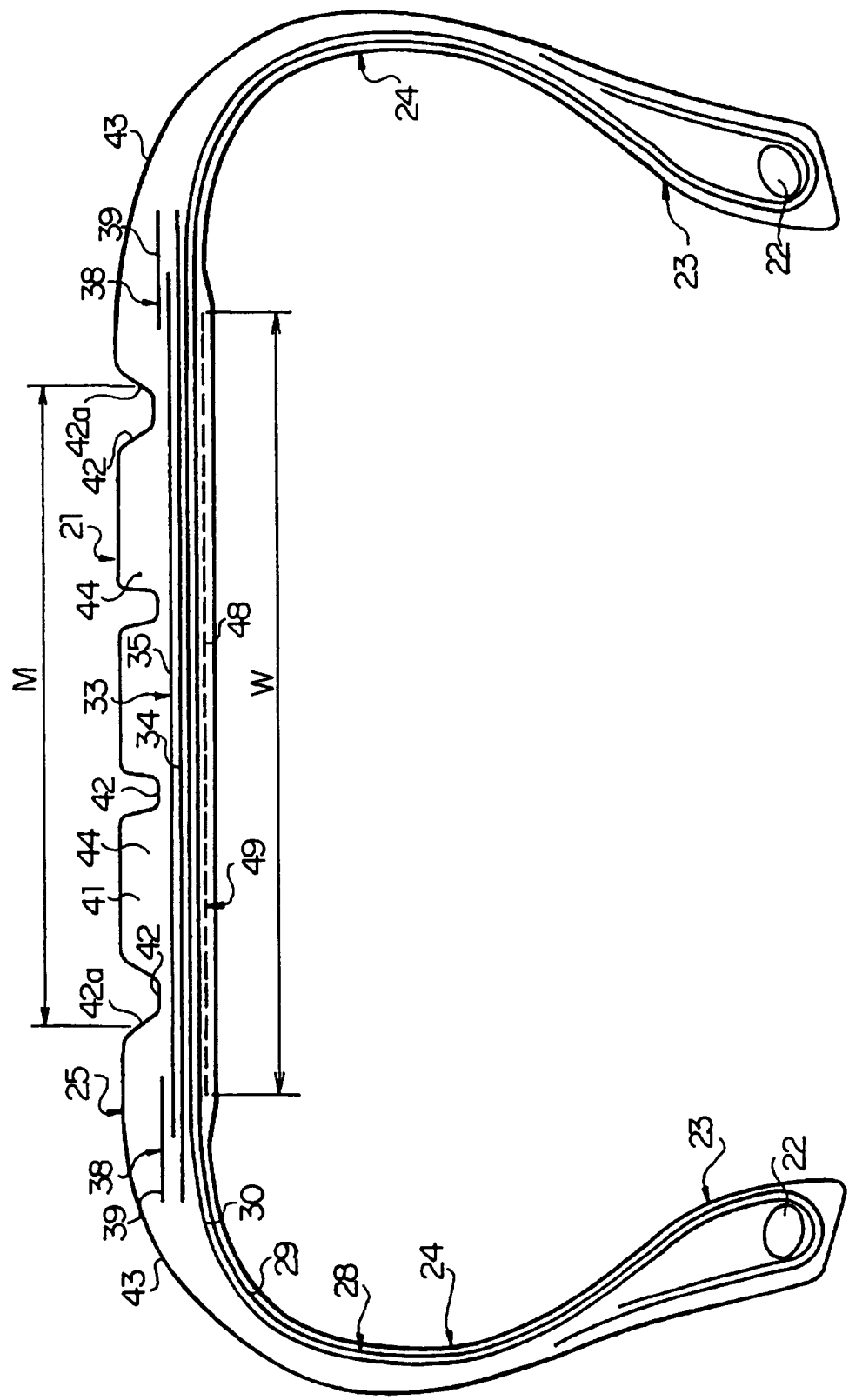
FIG. 1 is a cross sectional view of a pneumatic tire at the meridian according to one embodiment of the present invention.
Figure 2:
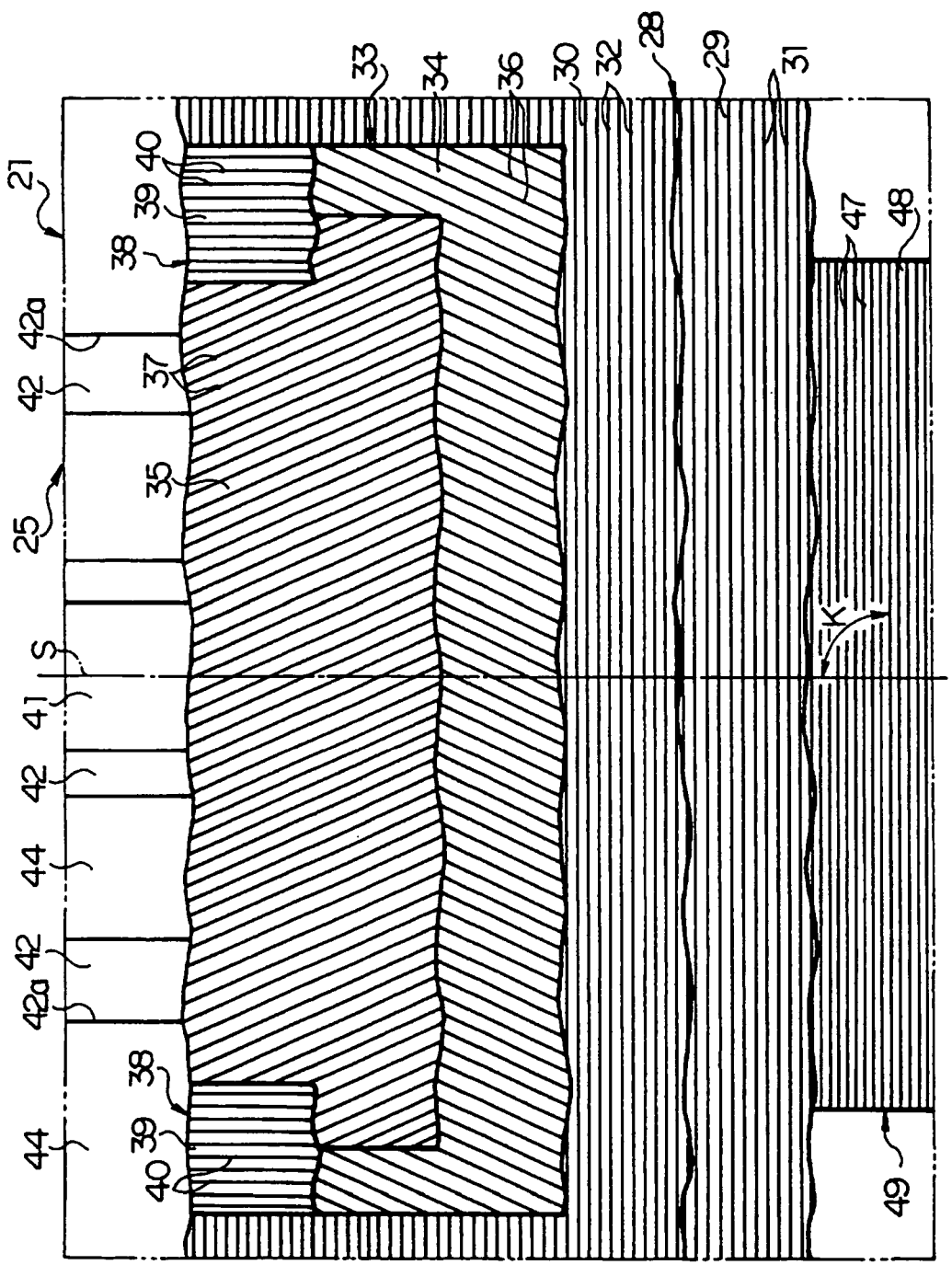
FIG. 2 is a partially exploded plane view of the tread portion.

With reference to the drawings, one embodiment of the present invention will be discussed below. In FIGS. 1 and 2, the reference numeral 21 denotes a pneumatic tire for mounting on a passenger vehicle, track, bus or the like. The pneumatic tire 21 has a pair of bead portions 23 in which respective ring shaped beads 22 are embedded, side wall portions 24 extending outwardly from the bead portions 23 generally in the radial direction, and a generally cylindrical shaped tread portion 25 connecting the radially outer ends of the side wall portions 24.

The pneumatic tire 21 further has a carcass layer 28 toroidally extending between the beads 22 and reinforcing the tread portion 25. Both of the end portions of the carcass layer 28 are turned around the beads 22 from the axially inside to the axially outside. The carcass layer 28 consists of at least one carcass ply, in this case two carcass plies 29, 30. Inside of the carcass plies 29, 30, a number of reinforcing cords 31, 32 that is made from an organic fiber such as nylon and polyester crossing the tire equator S at 90 degrees, i.e. extending in the radial (medional) direction.

The reinforcing cords 31, 32 may be inclined at a large angle, for example 70 degrees, with respect to the tire equator S. In this case, the inclining directions of the reinforcing cords 31, 32 are opposite to those of the carcass plies 29, 30 and the reinforcing cords 31, 32 cross with each other.

The reference numeral 33 denotes a belt layer arranged radially outside of the carcass layer 28. The belt layer 33 is configured by laminating plural (in this case, two) belt plies 34, 35. Inside of the belt plies 34, 35, a number of reinforcing cords 36, 37 made from non-stretchable material such as steel and an aromatic polyamide fiber or an organic fiber such as nylon are embedded.

The reinforcing cords 36, 37 embedded in the belt plies 34, 35 are inclined at 10 to 40 degrees in mutually opposite directions with respect to the tire equator S and cross with each other at least between two belt plies 34, 35. The reference numeral 38 denotes a pair of auxiliary layers that are arranged at the both of the end portions of the belt 33 radially outside of the belt layer 33 and that consist of at least one auxiliary ply 39. Reinforcing cords 40 that are made from an organic fiber such as nylon and polyester and that extend substantially in the circumferential direction are embedded in the auxiliary plies 39.

The reference numeral 41 denotes a tread that is made from rubber and that arranged radially outside of the carcass layer 28 and the belt layer 33. Plural of wide main grooves, in this case four main grooves 42 extending substantially in the circumferential direction are formed on the outer circumference of the tread 41. The main grooves may linearly extend as in this embodiment, but may be folded in a zigzag shape, or may be inclined at a certain angle, for example about 30 degrees, with respect to the circumferential direction to form a generally V shape. In this way, when the main grooves 42 are formed on the outer circumference of the tread 41, land portions 44, in this case rib shaped land portions, are defined between the tread end 43 and the main groove 42 and between the adjacent main grooves 42. In some cases, transversal grooves that extend generally in the tire width direction to cross the main grooves may be formed on the outer circumference of the tread 41, and thus the land portions 44 of such a tire may have a block shape.

When the given internal pressure is applied to the pneumatic tire 21 and thereafter the tire is rotated under load, the parts of the carcass layer 28 and the belt layer 33 in the ground contact area near the positions overlapping with the main grooves are convexly curved toward the outside in the radial direction because, as mentioned in the above, the land portion 44 that acts as a support does not exist on these parts and the bending rigidity of the belt layer 33 is relatively low. Inside the curved parts, a tensile force tends to be generated in the radially outside from the neutral axis of deformation which usually locates near the radially innermost belt ply 34, and a compression force tends to be generated in the radially inside from the neutral axis.

For this reason, in this embodiment, a number of steel cords 47 extending in the direction including the tire width direction and its approximate direction are embedded radially inside of the radially outermost carcass ply 30 displaced in the tread portion 25, and a reinforcing layer 49 that overlaps with the main grooves 42 and that consists of at least one reinforcing ply 48 is arranged radially inside of the radially outermost carcass ply 30 displaced in the tread portion 25. In this context, the direction including the tire width direction and its approximate direction, which are the extending direction of the steel cords 47, refers not to the direction approximate to the tire circumferential direction but to the direction including both of the tire width direction and the direction approximate to the tire width direction. Specifically, it is the direction inclined at 45 to 90 degrees with respect to the tire equator S.

As a result, a number of steel cords 47 extending in the direction including tire width direction and its approximate direction are arranged at the position spaced from the neutral axis of deformation in the compressed side in a certain distance, and the reinforcing layer 49 in which such cords are embedded acts as a support for resisting against the compression force, thereby effectively suppressing the above-mentioned curved deformation of the carcass layer 28 and the belt layer 33 to give a uniform distribution of the ground contact pressure on the land portions 44. As a result, the drivability of the pneumatic tire is improved and the uneven wear is suppressed to improve the wear resistance. As mentioned in the above, when the reinforcing cords 31 made from an organic fiber are embedded in the carcass plies 29, 30, the bending rigidity of the carcass layer 28 is small and thus the amount of the curved deformation becomes larger. The present invention can be effectively suppress the curved deformation of such a pneumatic tire 21 with a larger amount of the curved deformation and is especially preferred.

In this embodiment, the reinforcing layer 49 is arranged radially inside of all of the carcass plies 29, 30, i.e. radially inside of the radially innermost carcass ply 29. As a result, the radial distance from the neutral axis of deformation to the reinforcing layer becomes longer to further enhance supporting function of the steel cords 47 of the reinforcing layer, so that the effect of suppressing the curved deformation is enhanced to further improve the drivability and wear resistance.

Figure 3:
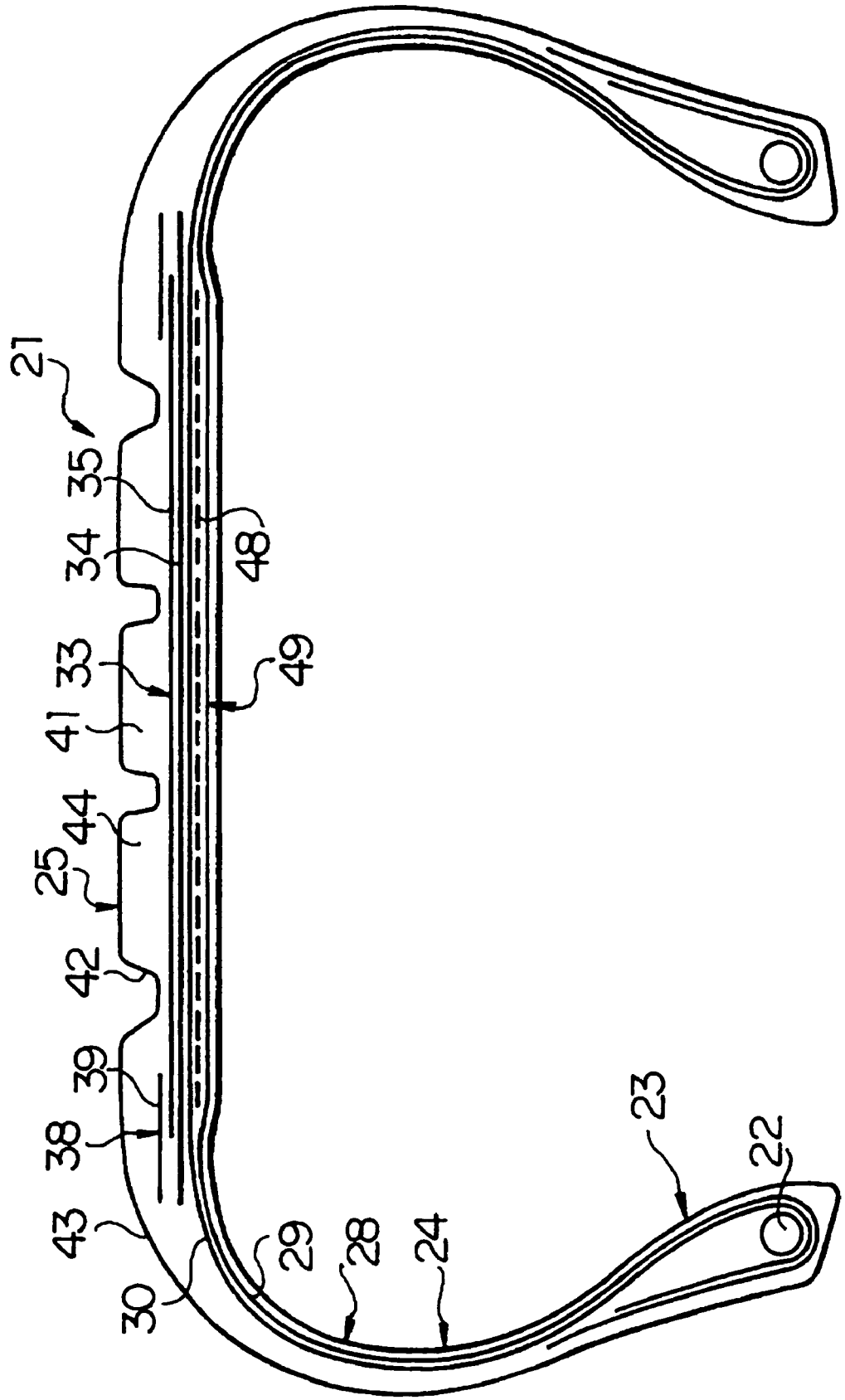
FIG. 3 is a cross sectional view of a pneumatic tire at the meridian according to another embodiment of the present invention.
Figure 4:
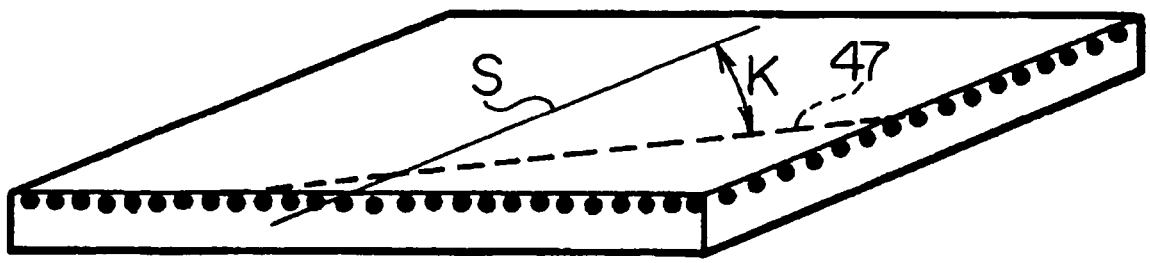
FIG. 4 is a perspective view of the test piece.

On the other hand, as mentioned in the above, when the carcass layer 28 consists of two or more carcass plies 29, 30, the reinforcing layer 49 may be arranged between the adjacent carcass plies 29, 30, as shown in FIG. 3. With such an arrangement, the radial distance from the neutral axis of deformation to the reinforcing layer 49 becomes shorter to slightly reduce the effect of suppressing the curved deformation, but the cut edge of the steel cords 47 exposed at both of the width ends of the reinforcing layer 49 are surrounded by the carcass plies 29, 30 so that it can effectively prevent cracks from occurring at the outer edge of the reinforcing layer 49 in the width direction.

With reference again to FIGS. 1 and 2, the crossing angle K of the steel cords 47 embedded in the reinforcing layer 49 with respect to the tire equator S is preferably within the range from 60 degrees to 90 degrees. This is because the crossing angle K within these range intensively restrain the curved deformation, which is shown in the test result described in the below, so that the drivability and the wear resistance are greatly improved. The larger the crossing angle K is, the greater the effect of suppressing the curved deformation is.

The above-described test results are obtained by the following tests. Firstly, reinforcing layers each having different crossing angles K of the steel cords 47 with respect to the tire equator S by 10 degrees are applied on the uppermost surface to prepare plural square rubber sheets (test pieces) in which the length of each side is 100 mm and the thickness is 8 mm. Then, each of the rubber sheets is placed on a pair of horizontal supporting members which extend in parallel with the tire equator S and which spaced from each other in 80 mm. Thereafter, a rectangular column-shaped plumb bob which extends in parallel with the tire equator S and which is 4.9 N is placed on the rubber sheet at is center in the width direction to apply a load.

Figure 5:
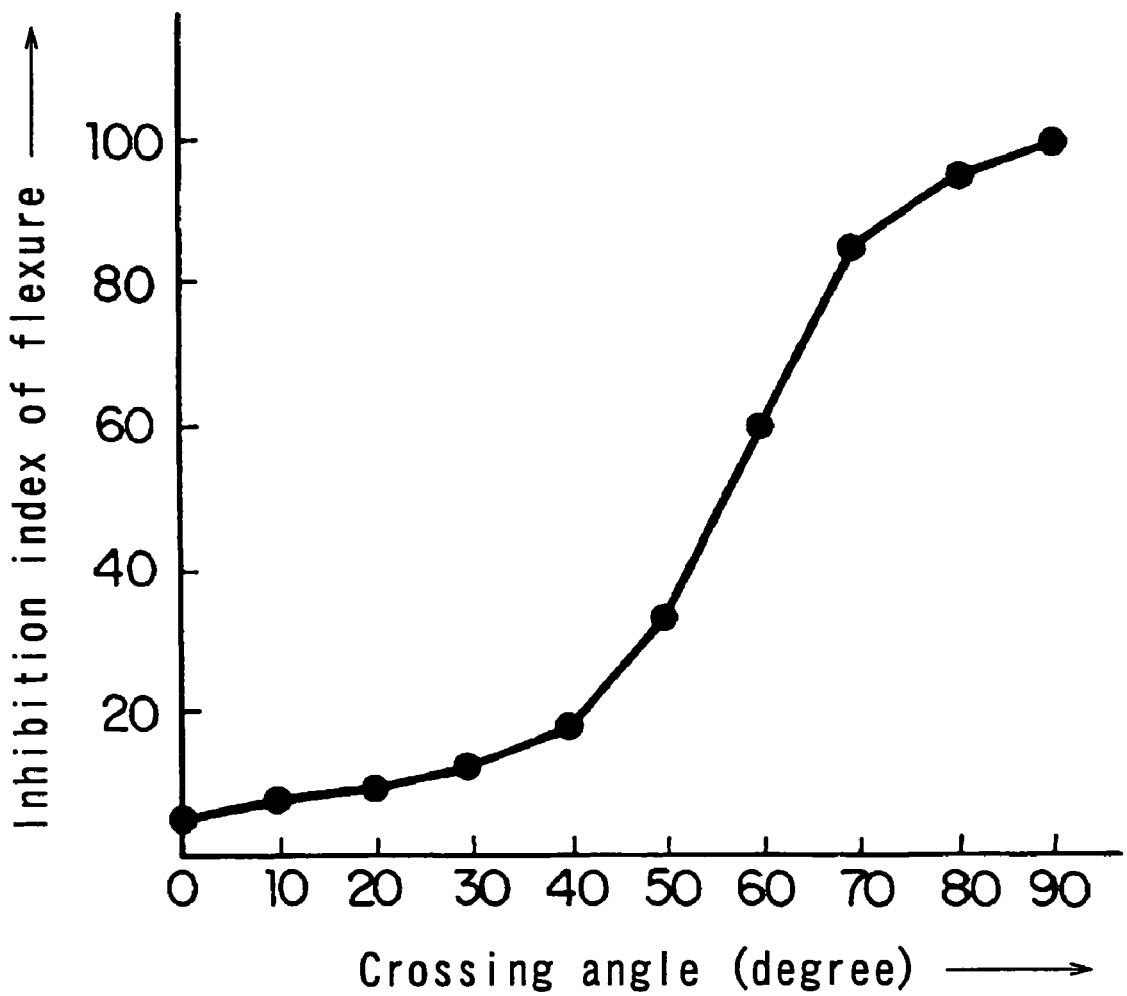
FIG. 5 is a graph representing the result of the test.

The maximum flexures of each of the rubber sheets under the above-mentioned load are measured and the results are shown in FIG. 5 as indexes with assuming that the inverse number of the flexure at the crossing angle K of 90 degrees is an inhibition index of 100. The maximum flexure of the rubber sheet at the crossing angle of 90 degrees is 3.0 mm. Three wires having the wire diameter of 0.23 mm are twisted to form steel cords 47, and the steel cords 47 are arranged in parallel with each other with leaving a space of 2 mm between them to configure the reinforcing layer 49.

When the carcass layer 28 consists of two carcass plies 29, 30 in which reinforcing cords 31, 32 made from an organic fiber and extending in mutually opposite directions with respect to the tire equator S are embedded and the reinforcing layer 49 is arranged radially inside of all of the carcass plies 29, 30, i.e. radially inside of the radially innermost carcass ply 29, as shown in FIG. 1, the extending direction of the steel cord 47 in the reinforcing layer 49 is preferably in parallel with the extending direction of the reinforcing cord 31 in the innermost carcass ply 29 adjacent to the reinforcing layer 49.

Similarly, when the carcass layer 28 consists of two carcass plies 29, 30 in which reinforcing cords 31, 32 made from an organic fiber and extending in mutually opposite directions with respect to the tire equator S and the reinforcing layer 49 is arranged between the two adjacent carcass plies 29, 30, as shown in FIG. 3, the extending direction of the steel cord 47 in the reinforcing layer 49 is preferably in parallel with the extending direction of the reinforcing cord 31 or 32 in the inner carcass ply 29 or the outer carcass ply 30, respectively, both of which adjacent to the reinforcing layer 49.

This is because when the extending direction of the steel cord 47 in the reinforcing layer 49 is in parallel with the extending direction of the reinforcing cord 31 or 32 in the carcass ply 29 or 30 adjacent to the reinforcing layer 49 as is the case with the above-mentioned two examples, cracks can be prevented from occurring at the outer edge of the reinforcing layer 49, i.e. the cut edge of the steel cord 47 more effectively than in the case where these extending directions cross with each other at a certain angle.

The width W of the reinforcing layer 49 is preferably wider than the space M between the outer wall surfaces 42a of the two main grooves 42 located outermost in the width direction. This is because such a configuration can simplify an operation of building the tire, i.e. an operation of attaching the reinforcing layer and the curved deformations can be effectively suppressed for all of the main grooves 42. However, if the width W of the reinforcing layer 49 is wider than the tread width, cracks may occur at the transversal outer edge of the reinforcing layer 49, so the width W of the reinforcing layer 49 should be narrower than the tread width.

The reinforcing layer 49 may consist of reinforcing layer pieces which are arranged at the positions overlapping with each of the main grooves 42 and which have slightly wider width than the width of the main grooves 42 and the number of which is the same as the number of the main grooves 42. Alternatively, the reinforcing layer 49 may consist of two reinforcing layer pieces which overlap with the main grooves 42 disposed on one side and the other side, respectively, of the tire equator S and which have slightly wider width than the distance between the main grooves 42 disposed on one side and the distance between the main grooves 42 disposed on the other side.

EXAMPLES

Next, the experimental example 1 is discussed. For this experiment, there are prepared a conventional tire 1 in which no reinforcing layer is arranged, a comparative tire 1 in which steel cords having the cross angle K of 30 degrees are embedded in a reinforcing layer and the reinforcing layer is arranged radially inside of the innermost carcass ply, an example tire 1 in which steel cord having the cross angle K of 90 degrees are embedded in a reinforcing layer and the reinforcing layer is arranged between two carcass plies, an example tire 2 in which steel cord having the cross angle K of 90 degrees are embedded in a reinforcing layer and the reinforcing layer is arranged radially inside of the innermost carcass ply, and an example tire 3 in which steel cord having the cross angle K of 70 degrees are embedded in a reinforcing layer and the reinforcing layer is arranged radially inside of the innermost carcass ply.

The above-mentioned tires are for passenger vehicle and have a size of 215/55R15. These tires have the configuration shown in FIG. 1 or 3 and include a carcass layer consisting of two carcass plies in which nylon cords crossing the tire equator S at 90 degrees are embedded, a belt layer consisting of two belt plies in which steel cords crossing the tire equator at 25 degrees in mutually opposite directions are embedded, a auxiliary layer in which nylon cords extending substantially in parallel with the tire equator S are embedded, and a reinforcing layer in which steel cords formed by twisting three wires having the diameter of 0.23 mm are arranged in parallel with each other with leaving a space of 2 mm between them and which has a width of 150 mm.

Each of these tires is pressurized with the internal pressure of 200 kPa and then is slowly rotated on a road surface for one revolution while a vertical load of 5 kN being applied thereon. In resting state after the rotation, an X-ray photograph of the section of the tire under the load is taken and the amount of maximum deformation of the steel cord in the inner belt ply overlapping with the transversely outermost main groove is measured. As the result, the amount of maximum deformations are 0.7 mm in the conventional tire 1, 0.6 mm in the comparative tire 1, 0.3 mm in the example tire 1, 0.1 mm in the example tire 2, and 0.2 mm in the example tire 3, which means that the amount of maximum deformations are reduced in the example tires.

The above-mentioned conventional tire 1, and example tires 1 and 2 are mounted on passenger vehicles and a test driver evaluates their drivability. As a result, upon changing the lane during straight running, the evaluation of the example tire 2 is that it quickly responds and its movement is zippy, while the evaluation of the example tire 1 is that the drivability is not as good as that of the example tire 2 but is apparently improved as compared with the conventional tire 1. These evaluations are 80 marks for the example tire 1 and 60 marks for the example tire 2, with the evaluation of the conventional tire 1 being set to 100. The smaller the mark is, the better the drivability is.

Next, the experimental example 2 is discussed. For this experiment, there are prepared a conventional tire 2 in which no reinforcing layer is arranged, an example tire 4 in which steel cords having the cross angle K of 70 degrees and being in parallel with the reinforcing cords in the outer carcass ply are embedded in a reinforcing layer and the reinforcing layer is arranged between two carcass plies, an example tire 5 in which steel cord having the cross angle K of −70 degrees and being in parallel with the reinforcing cords in the inner carcass ply are embedded in a reinforcing layer and the reinforcing layer is arranged between two carcass plies, and an example tire 6 in which steel cord having the cross angle K of 90 degrees are embedded in a reinforcing layer and the reinforcing layer is arranged between two carcass plies.

Figure 6:
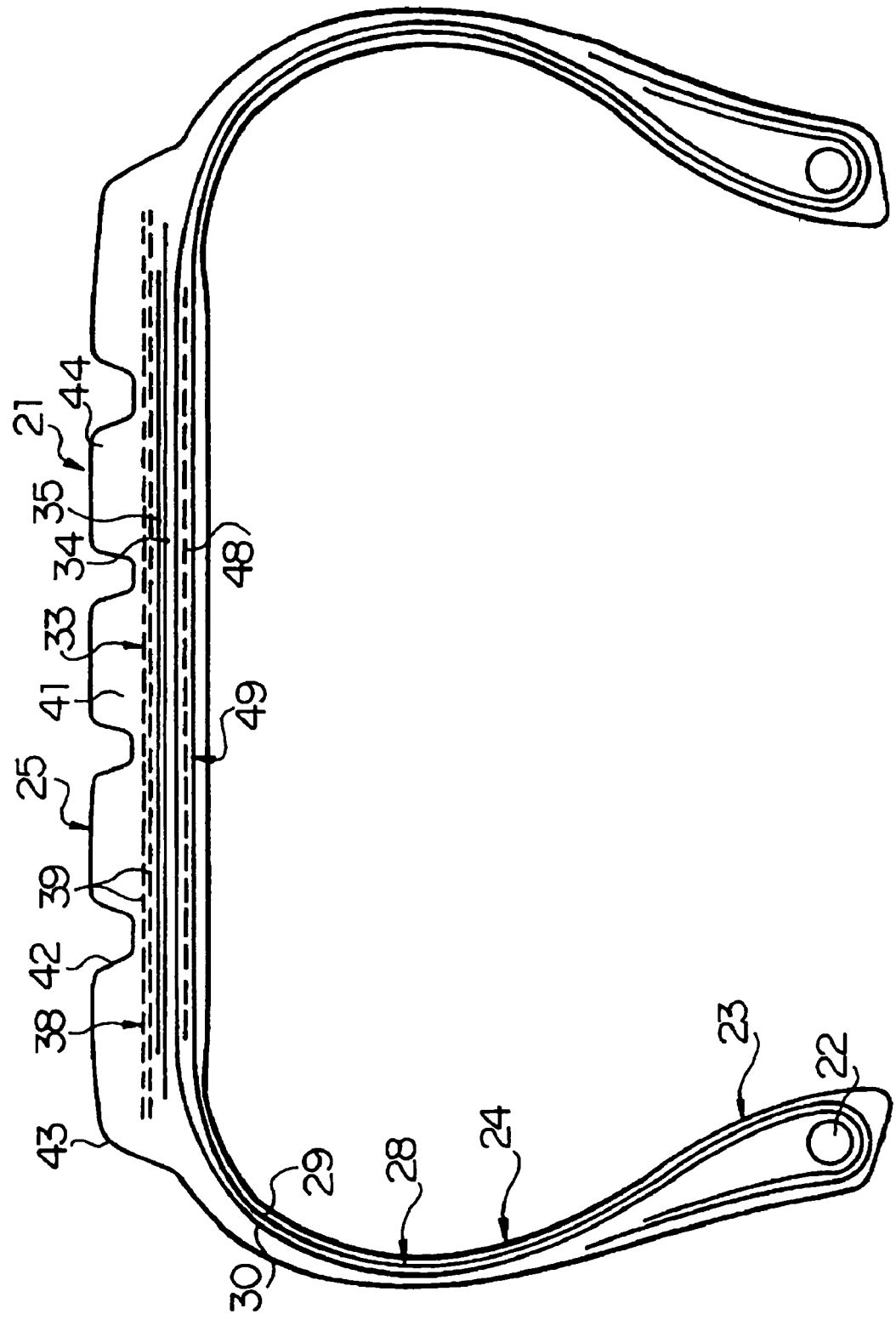
FIG. 6 is a cross sectional view of the pneumatic tire used in the experimental example 2 at the meridian.

The above-mentioned tires are for light tracks and have a size of 265/75R16. These tires have the configuration shown in FIG. 6 and include a carcass layer consisting of an inner carcass ply in which nylon cords crossing the tire equator S at −70 degrees are embedded and an outer carcass ply in which nylon cords crossing the tire equator S at 70 degrees are embedded, a belt layer consisting of two belt plies in which steel cords crossing the tire equator at 25 degrees in mutually opposite directions are embedded, a auxiliary layer consisting of two auxiliary plies in which nylon cords extending substantially in parallel with the tire equator S are embedded and which cover the entire belt layer from outside, and a reinforcing layer in which steel cords formed by twisting three wires having the diameter of 0.23 mm are arranged in parallel with each other with leaving a space of 2 mm between them and which has a width of 200 mm.

Each of these tires is pressurized with the internal pressure of 200 kPa and then is slowly rotated on a road surface for one revolution while a vertical load of 7 kN being applied thereon. In resting state after the rotation, an X-ray photograph of the section of the tire under the load is taken and the amount of maximum deformation of the steel cord in the inner belt ply overlapping with the transversely outermost main groove is measured. As the result, the amount of maximum deformations are 0.9 mm in the conventional tire 2, 0.2 mm in the example tire 4, 0.2 mm in the example tire 5, and 0.1 mm in the example tire 6, which means that the amount of maximum deformations are reduced in the example tires.

Figure 7:
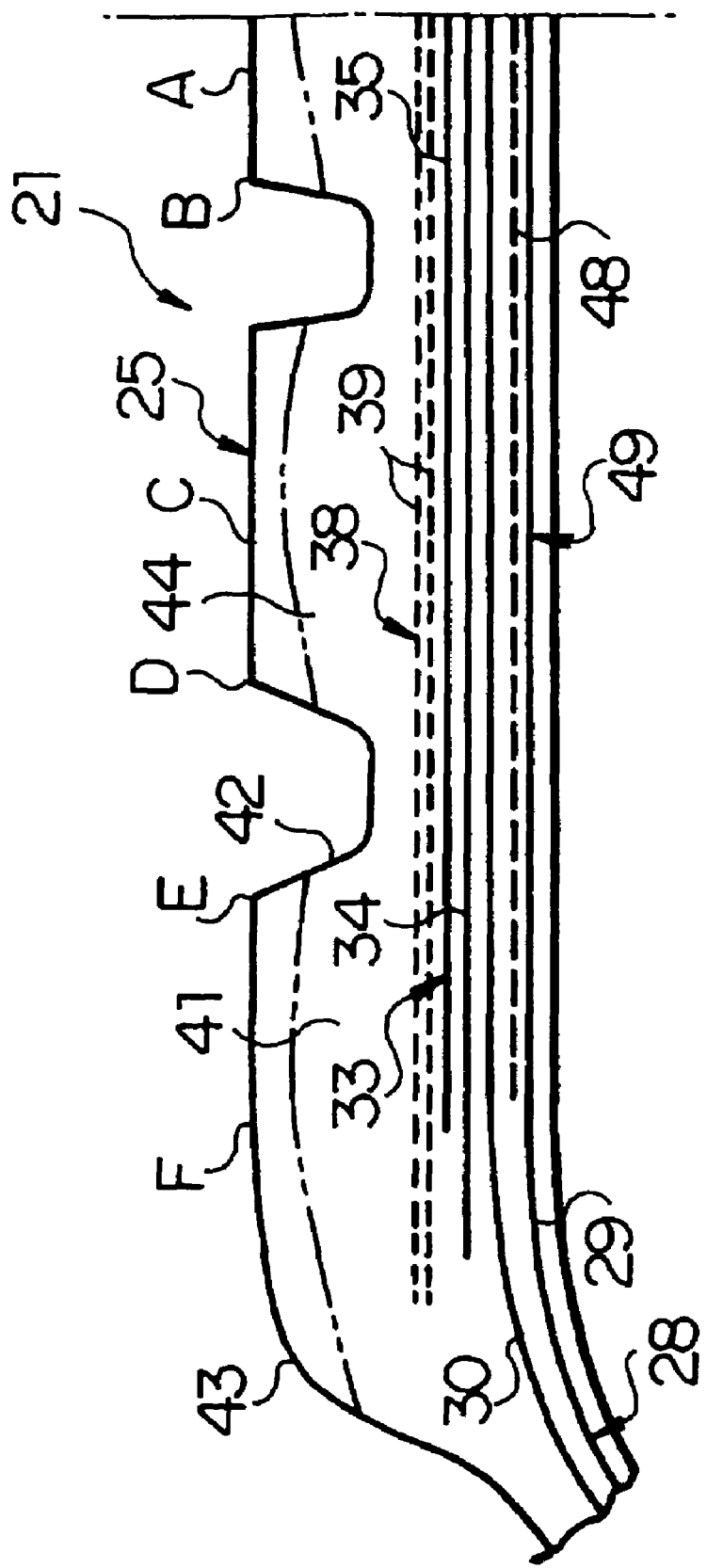
FIG. 7 is a cross sectional view of the pneumatic tire used in the experimental example 2 at the meridian showing its wearing state.

The conventional tire 2 and the example tire 4 are traveled on a drum having a rough outer circumference surface and the diameter of 3 m over 10,000 km at 60 km/h while applying load of 5 kN. In this test, the slip angle is changed in the order of 0.5 degrees, 0 degree, −0.5 degrees, 0 degree, 0.5 degrees, 0 degrees . . . in every 20 seconds. With the observation of the tread after the completion of traveling, the outer surface of the tread is cut back from the solid line to the dashed line shown in FIG. 7 due to wear.

The amounts of wear at points A, B, C, D, E and F on the outer surface of the tread are measured for both of the above-mentioned tires. As the result, the amounts are 1.5 mm, 2.0 mm, 1.4 mm, 2.0 mm, 2.3 mm and 1.7 mm, respectively, in the conventional tire 2, which indicates that the amounts of wear are largely different between the end part and the center part of the land portion, while the amounts are 1.6 mm, 1.7 mm, 1.6 mm, 2.1 mm and 1.9 mm, respectively, which are much more uniform than in the conventional tire 2.

The example tires 4, 5 and 6 are traveled on a drum having smooth surface and the diameter of 3 m at the slip angle of 0.5 degrees and the speed of 100 km/h while applying load of 5 kN. The load is increased with a step of 1 kN at every 2 hours and this is continued until the tire is broken. In this way, the durability of the tire is measured. As a result, in the example tires 4 and 5, the durability indexes are improved to be 110, with the index of example tire 6 being set to 100. The conditions of failure of the tires are observed to find that the cause of the failure is the cracks at the cut edge of the steel cords embedded in the reinforcing layer in every tire.

Next, the experimental example 3 is discussed. For this experiment, there are prepared a conventional tire 3 in which no reinforcing layer is arranged, an example tire 7 in which steel cord having the cross angle K of 90 degrees are embedded in a reinforcing layer and the reinforcing layer is arranged between two carcass plies, and an example tire 8 in which steel cord having the cross angle K of 90 degrees are embedded in a reinforcing layer and the reinforcing layer is arranged radially inside of the innermost carcass ply.

Figure 8:
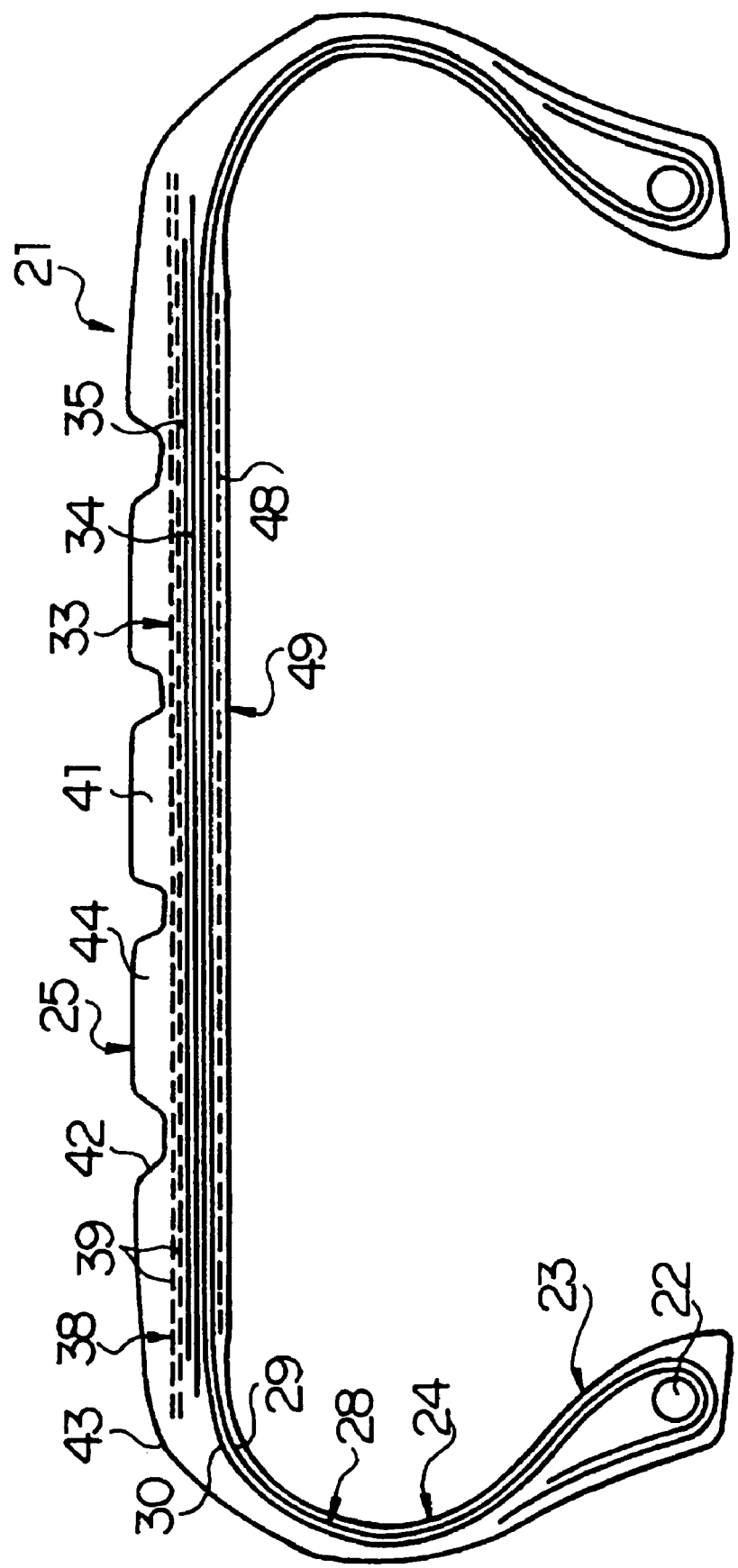
FIG. 8 is a cross sectional view of the pneumatic tire used in the experimental example 3 at the meridian.
Figure 9:
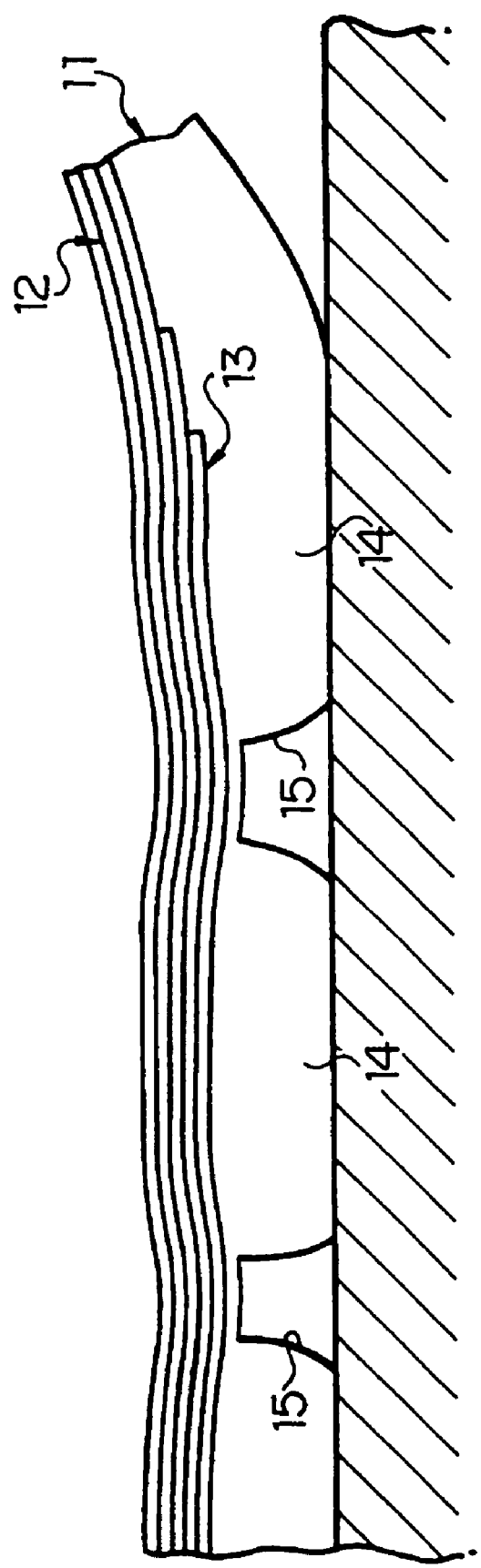
FIG. 9 is a cross sectional view at the meridian for explaining the deformations of the carcass layer and belt layer at the parts overlapping with the main grooves.

The above-mentioned tires are for passenger vehicle and have a size of 245/40R17. These tires have the configuration shown in FIG. 8 and include a carcass layer consisting of two carcass plies in which nylon cords crossing the tire equator S at 90 degrees are embedded, a belt layer consisting of two belt plies in which aromatic polyamide cords crossing the tire equator at 25 degrees in mutually opposite directions are embedded, a auxiliary layer consisting of two auxiliary plies in which nylon cords extending substantially in parallel with the tire equator S and which cover the entire belt layer from outside are embedded, and a reinforcing layer in which steel cords formed by twisting three wires having the diameter of 0.23 mm are arranged in parallel with each other with leaving a space of 2 mm between them and which has a width of 190 mm.

Each of these tires is pressurized with the internal pressure of 220 kPa and then is slowly rotated on a road surface for one revolution while a vertical load of 5 kN being applied thereon. In resting state after the rotation, an X-ray photograph of the section of the tire under the load is taken and the amount of maximum deformation of the steel cord in the inner belt ply overlapping with the transversely outermost main groove is measured. As the result, the amount of maximum deformations are 1.4 mm in the conventional tire 3, 0.3 mm in the example tire 7, and 0.2 mm in the example tire 8, which means that the amount of maximum deformations are reduced in the example tires.

The above-mentioned conventional tire 3, and example tire 7 are mounted on passenger vehicles and a test driver evaluates their drivability. As a result, the example tire 7 exhibits superior drivability and an improved breaking performance in all of the corners. Further, in the test running on a small circuit which can be lapped within about 40 seconds, the lap time of the vehicle equipped with the example tire 7 is shorter than that of the vehicle equipped with the conventional tire 3 by 1.2 seconds.

INDUSTRIAL APPLICABILITY

The present invention can be applied to the industrial field of pneumatic tires.

The invention claimed is:

1. A pneumatic tire having a carcass layer which toroidally extends between beads and which is composed of a plurality of carcass plies, a belt layers which is disposed radially outside of the carcass layer, and a tread which is disposed radially outside of the belt layer and which is provided with plural main grooves on the outer circumference,
wherein a reinforcing layer is arranged radially inward of all of the carcass plies and disposed in the tread to overlap with said main grooves,
wherein steel cords extending in a direction including the tire width direction and its approximate direction are embedded in the reinforcing layer,
wherein the width of the reinforcing layer is narrower than the tread width, and
wherein a cross angle of the steel cords embedded in the reinforcing layer with respect to the tire equator is within the range from 60 degrees to 90 degrees.

2. The pneumatic tire according to claim 1, wherein the width of the reinforcing layer is wider that the distance between the outer wall surfaces of the two main grooves located outermost in the width direction.

3. The pneumatic tire according to claim 1, further comprising at least two carcass plies;
wherein the extending direction of the steel cords in the reinforcing layer is in parallel with the extending direction of the reinforcing cords in the inner carcass ply, and wherein reinforcing cords of organic fiber inclining in opposite directions with respect to the tire equator are disposed within the carcass plies.

4. The pneumatic tire according to claim 1, wherein the extending direction of the steel cords in the reinforcing layer is in parallel with the extending direction of the reinforcing cords in the inner carcass ply or the outer carcass ply in which reinforcing cords of organic fiber inclining in opposite directions with respect to the tire equator are disposed.

5. The pneumatic tire according to claim 1, wherein the width of the reinforcing layer is narrower than the width of the belt layer.

\* \* \* \* \*